Patented June 10, 1930

1,763,080

UNITED STATES PATENT OFFICE

WILLIAM C. ARSEM, OF SCHENECTADY, NEW YORK, ASSIGNOR TO INDUSTRIAL TECHNICS CORPORATION, OF SCHENECTADY, NEW YORK, A CORPORATION OF NEW YORK

PRODUCTION OF DRY LEVULOSE OR CARBOHYDRATE MIXTURES

No Drawing. Application filed January 31, 1927. Serial No. 165,042.

This invention relates to the production of levulose and more particularly to the production of dry levulose direct from inulin by hydrolyzing the inulin in the presence of only the theoretical amount of water necessary to convert it into levulose.

Inulin, $C_{36}H_{62}O_{31}$, may be obtained from inulin bearing plants, such as dahlia bulbs, Jerusalem artichoke, chicory, elecampane and burdock in various ways and in practicing the process of the present invention, inulin obtained in any of the various known ways may be used. However, I prefer to use inulin obtained from inulin bearing plants by the processes disclosed in my copending applications, Serial #369,537 (now Patent No. 1,616,166, granted February 2, 1927) and Serial #424,459 (now Patent No. 1,616,167, granted February 1, 1927).

Inulin may be hydrolyzed to produce levulose, $C_6H_{12}O_6$, and levulose so produced is particularly suitable as a substitute for sucrose (beet or cane sugar), for certain important uses such as the preparation of soda syrups and soft drinks, the preservation of foods, the manufacture of confectionery, for general cooking purposes and for table and similar uses. Levulose will meet the requirements necessary in a substitute for sucrose that are not met by other non-sucrose syrups heretofore employed, such as starch syrups, corn syrups, malt syrups and the like. It possesses the property of sweetness in greater degree than even cane or beet sugar and is particularly useful in the preparation of carbonated and soft drinks, confectionery and the like.

In hydrolyzing inulin to produce levulose it has heretofore been customary to form a solution of inulin in water in excess of the amount necessary in the hydrolysis and to obtain the levulose in solution after the hydrolysis has been completed. The levulose must then be separated from the solution either by concentration or in some other manner.

I have found that dry levulose of a good grade may be formed directly from inulin using only the theoretical amount of water necessary in hydrolyzing. In this manner the preparation of levulose may be materially simplified and the necessity of removing it from the solution after hydrolysis can be eliminated. The process may be varied to obtain products of varying degrees of sweetness by controlling the hydrolysis in such manner that the final product will contain levulose mixed with definite percentages of carbohydrates less sweet than levulose.

In practicing the process, inulin from any source and in any desired quantity is mixed with the theoretical amount of water necessary to convert it into levulose. This can be readily determined from the molecular weights of the two substances and the necessary amount of water added to a given quantity of inulin. The mixture is then heated in a closed container in the presence of a soluble acid anhydride under pressure until conversion of the inulin into levulose is complete. The pressure is then released and the residual gas allowed to escape or removed by the application of a vacuum. The product obtained consists of a good grade of dry levulose which may be used in the same manner as levulose prepared by other processes and separated from the solution by concentration.

In a typical embodiment of the invention 1000 pounds of inulin are mixed with 11.55 gallons of water. The solution is stirred until a uniform mixture of the water and inulin is formed. It is then placed in a closed container and the soluble acid anhydride added. Various materials may be employed for this purpose, but I prefer to employ sulphur dioxide or carbon dioxide, either of which may be admitted to the container after the solution of inulin has been placed therein. The mixture is then heated to a temperature of substantially 100° C. under pressure of 10 to 100 lbs. per square inch for a period of about one hour or until conversion is complete. The pressure is then released and the residual gases either permitted to escape or withdrawn from the container by suction. The product obtained consists of a good grade of dry levulose.

By varying the amount of water added and the time of treatment the final product obtained will consist of levulose mixed with carbohydrates less sweet than the levulose. This variation of the process can be so regulated that a product of any desired degree of sweetness can be obtained.

I claim:

1. The method of hydrolyzing inulin to form levulose consisting essentially of mixing with a quantity of inulin the theoretical amount of water necessary to hydrolyze it, adding a soluble acid anhydride and heating in a closed container.

2. The method of hydrolyzing inulin to form levulose consisting essentially of mixing with a quantity of inulin the theoretical amount of water necessary to hydrolyze it, adding sulphur dioxide thereto and heating in a closed container.

3. The method of hydrolyzing inulin to form levulose consisting essentially of mixing with a quantity of inulin the theoretical amount of water necessary to hydrolyze it, adding a soluble acid anhydride and heating to a temperature of substantially 100° C. in a closed container until the hydrolysis is complete.

4. The method of hydrolyzing inulin to form a levulose which comprises mixing a quantity of inulin with the theoretical amount of water necessary to hydrolyze it, adding a soluble acid anhydride thereto, heating the mixture in a closed container until substantially all of the inulin has been converted to levulose, releasing the pressure and removing the residual gas from the container.

5. The method of hydrolyzing inulin to form a levulose which comprises mixing a quantity of inulin with the theoretical amount of water necessary to hydrolyze it, adding a soluble acid anhydride thereto, heating the mixture in a closed container at a temperature of 100° C. until substantially all of the inulin has been converted into levulose, releasing the pressure and removing the residual gas from the container.

In testimony whereof I affix my signature.

WILLIAM C. ARSEM.